Jan. 20, 1925
A. C. STEWART
1,523,731
FUEL SUPPLY MEANS FOR INTERNAL COMBUSTION ENGINES
Filed Sept. 7, 1920    2 Sheets-Sheet 1
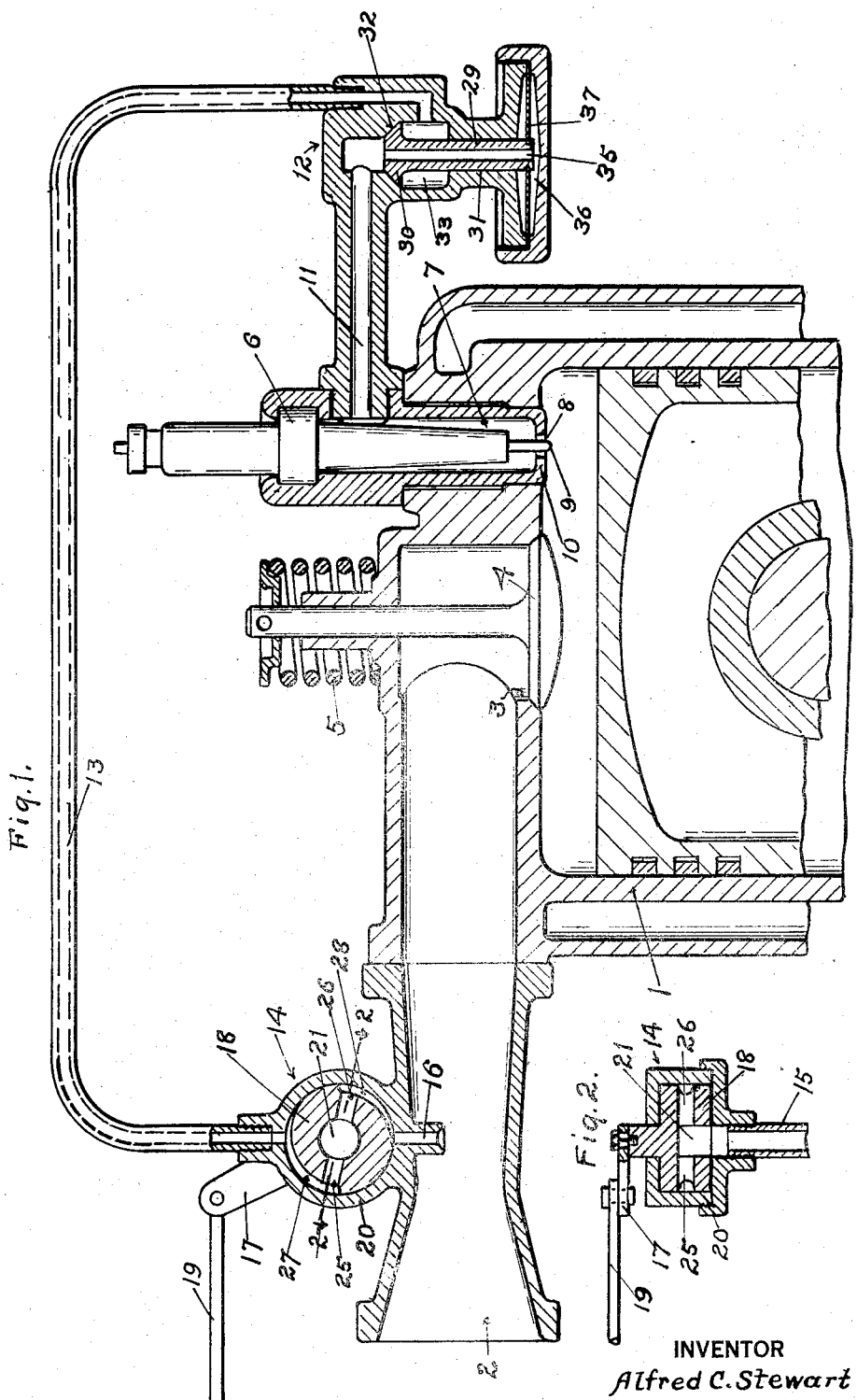
INVENTOR
*Alfred C. Stewart*
BY
*Arthur P. Knight*
ATTORNEY

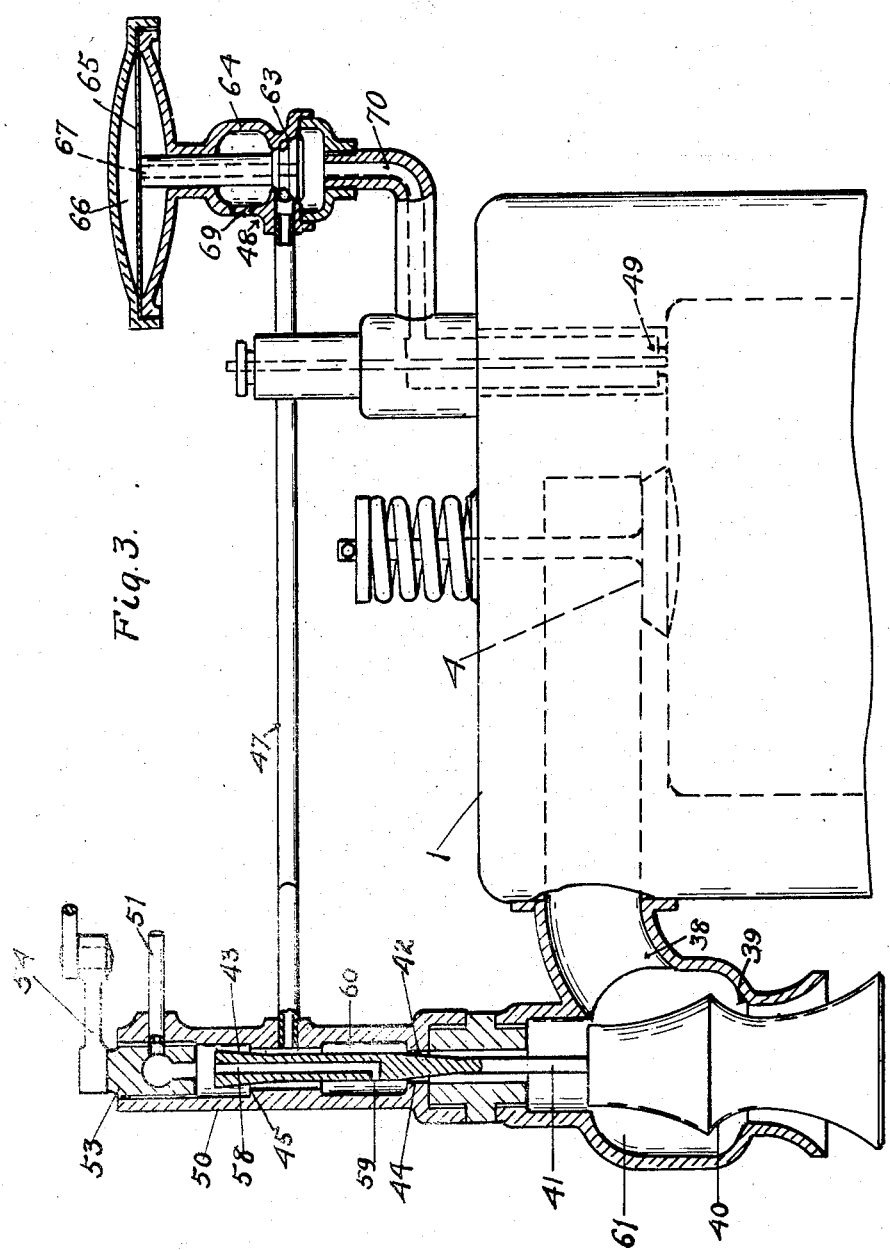

Patented Jan. 20, 1925.

1,523,731

UNITED STATES PATENT OFFICE.

ALFRED C. STEWART, OF LOS ANGELES, CALIFORNIA.

FUEL-SUPPLY MEANS FOR INTERNAL-COMBUSTION ENGINES.

Application filed September 7, 1920. Serial No. 408,693.

*To all whom it may concern:*

Be it known that I, ALFRED C. STEWART, a citizen of the United States, residing at Los Angeles, in the county of Los Angeles and State of California, have invented a new and useful Fuel-Supply Means for Internal-Combustion Engines, of which the following is a specification.

This invention relates to means for supplying liquid fuel to internal combustion engines, and the main object of the invention is to provide for maximum economy in the operation of the engine by ensuring a full supply of air at all times, thus insuring maximum compression. Another object of the invention is to provide for economical operation at low loads by admitting fuel only or especially to the air adjacent to the admission means. A further object of the invention is to provide for maximum power capacity by admitting additional fuel as required for heavy loads in such manner that it will be distributed to the full volume of air.

An important feature of my invention is the provision for unrestricted air supply to the intake valve of the engine, so that a throttle is dispensed with and a full charge of air is obtained, there being no interference with or diminution of the air supply by throttling action. In this case, the air entering at the intake of the engine cylinder is always substantially or approximately at atmospheric pressure thereby obtaining the maximum volumetric capacity of the engine. In connection with this method of operation of the air inlet, I provide for supplying fuel to the air inlet directly in a regulable manner, but without requiring suction of the fuel by a partial vacuum at the air inlet, such as is required in the case of the usual carburetors. With this method of operation the control of the engine is by means of the regulation or control of the fuel supply instead of by a throttle.

Another object of the invention is to ensure effective combustion of the mixture supplied to the engine, by providing for supply of fuel adjacent to the ignition means.

In the operation of an internal combustion engine of this type where there is no throttling of the air, and the suctional effect on the carbureter is, therefore, reduced to a minimum, the difficulty arises that in operation with a minimum fuel supply under light load, for example, effective ignition is not always secured, on account of the dilution of the mixture, the dilution being due to the full volumetric supply of air, together with the lack of strong suction of fuel into the engine. In order to overcome this objection I provide for supplying a certain amount of mixture to the engine cylinder at a point adjacent to the spark plug or ignition device so as to ensure effective ignition thereof, and also provide for supplying an additional amount of fuel to the cylinder along with air according to the requirements of the engine so that when the load on the engine is decreased this additional supply of mixture may be cut down but the minimum supply of fuel is always maintained in such position relative to the ignition device as to ensure effective ignition under all conditions.

The accompanying drawings illustrate embodiments of my invention, and referring thereto:

Fig. 1 is a vertical section of part of an engine cylinder provided with my improved fuel supply means adapted for manual control;

Fig. 2 is a section on line 2—2 in Fig. 1;

Fig. 3 is a vertical section of a fuel supply means according to my invention adapted for automatic control, a portion of the engine cylinder connected thereto being shown in elevation.

Referring to Fig. 1, the engine cylinder indicated at 1 is provided with an air inlet 2, which communicates with the cylinder through an inlet port 3 controlled by an inwardly opening valve 4 normally held closed by spring 5 and adapted to be opened in the suction or intake stroke of the engine in the usual manner. In the present case, this inlet is freely open to the atmosphere, except for the automatic valve 4, there being no throttling or other obstruction to the passage of the incoming air. Means are provided for supplying fuel directly to this inlet 2 and also for supplying liquid fuel at a point adjacent to the ignition device or spark plug 6, which is mounted in the engine cylinder in the usual manner. Said spark plug may, for example, be made with a passage 7 for conducting liquid fuel to the opening 8 between the point 9 of the spark plug and a surrounding metallic sleeve 10 thereof, said passage communicating by a conduit 11 with a check valve 12 to which a pipe 13 leads from the fuel control valve 14. Said fuel control valve has a fuel inlet 15 communicating with any suitable source of liquid fuel supply and is connected on one hand with outlet pipe 13, and on the other hand with an outlet duct 16 opening into the air inlet 2 aforesaid, said air inlet being preferably contracted adjacent to this fuel outlet duct 16 to increase the entraining effect on the fuel delivered at said outlet. The valve 14 is manually controlled in any suitable manner, for example, by means of an arm 17 on the plug 18 of said valve, said arm being connected by rod 19 to any suitable operating means, such as a pedal or handle in convenient position for manual or pedal operation. Valve 14 may be of suitable construction, for example, it may consist of a cylinder plug member 18 mounted to rotate within a cylindrical casing 20, said plug member having an axial bore 21 communicating with the fuel inlet 15 aforesaid, and with radial passages 25 and 26 leading, respectively, to circumferential channels 27 and 28, which taper or decrease in cross-section from one end to the other, as shown. The channel 28 which cooperates with the fuel outlet 16 is preferably shorter than the channel 27 which cooperates with the fuel outlet 13, so that communication with the outlet 13 is maintained after the fuel is shut off from the outlet 16.

Check valve 12 may be of any suitable construction, but for the purpose of ensuring quick action in closing the check valve on increase of pressure in the cylinder, I may use the form shown in Fig. 1 of the drawing, which comprises a valve plug 30 having a stem 29 mounted to slide in guide 31 and adapted to cooperate with a valve seat 32 to shut off communication between valve chamber 33 communicating with the pipe 13 and the fuel pipe 11 leading to the engine. Said valve is normally held in open position by the action of gravity, supplemented, if desired, by the action of suitable spring means, and is moved to closed position on the increase of pressure in the pipe 11 communicating with the engine by communication of the gases under pressure through a bore 35 in said valve to a chamber 36 extending below a diaphragm 37 connected to said valve, the upper face of this diaphragm being exposed to atmospheric pressure. As the area of this diaphragm is much greater than that of the valve, rapid and positive closing of the check valve is effected immediately upon increase of pressure in the engine cylinder. The fuel pipe 13 is, therefore, in communication with the engine cylinder only during the suction stroke in said cylinder.

The operation of the invention, as above described, is as follows:

In starting the engine, or when a full fuel supply is required, valve 14 is operated to open communication from the fuel inlet 15 to the fuel outlet 16 through passages 21, 26 and 28, as well as to fuel pipe 13 through passages 21, 25 and 27. During the intake stroke of the engine the fuel supply through the pipe 13 passes through the check valve 12 and the pipe 11 and passage 7 to the engine cylinder at a point adjacent to the spark plug and the fuel passing from the outlet 16 enters the air passing through the air inlet tube directly to the engine cylinder, inlet valve 4 being open at this time and the velocity of the air being sufficient to ensure mixture of the fuel with the incoming air. The amount of fuel admitted in this matter can be controlled by operating the valve 14 so as to increase or decrease the size of the passages 25, 27 and 28 opposite the fuel outlet ports, the taper of these passages providing for this control, and by this means the amount of fuel passing directly to the air inlet valve 4 and also the amount of fuel passing to the cylinder adjacent to the spark plug may be cut down simultaneously. There being no throttle, the full volumetric capacity of the engine cylinder is utilized in drawing in the charge, so that maximum volumetric efficiency is obtained, and under all conditions there is sufficient fuel supplied adjacent to the ignition means to ensure complete and rapid ignition of the mixture. When the engine is running very light the valve plug 18 is operated to shut off communication to the fuel outlet 16 leaving the passage 27 still in communication with the port leading to the fuel pipe 13, so that under these circumstances a certain amount of liquid fuel is still supplied to the engine cylinder adjacent to the ignition device or spark plug with the result that even with this small amount of fuel a sufficiently rich mixture is secured adjacent to the spark plug to ensure effective and rapid ignition of all of the fuel.

My invention may also be carried out in such manner that the control of the fuel supply is to a large extent automatic. For this purpose, a construction, such as shown in Fig. 3, may be employed, the engine cylinder 1, in this case, being provided with an air inlet 38 connecting with the engine cylinder through a spring closed intake valve 4 and having a valve seat 39 cooperating with a valve member 40, which is carried by a stem 41 provided with two valve cones 42 and 43, which cooperate, respectively, with valve seats 44 and 45 to control the fuel supply, respectively, to the air inlet 38 and to a fuel pipe 47 leading to a check valve 48, which is in communication with the engine cylinder adjacent to the ignition device 49. The air inlet valve member 40 is adapted to be operated by the difference in pressure existing between the outer end of the valve member and the inner portion thereof exposed to the reduced pressure in the air inlet 38, so that this air inlet valve member tends to rise and open the air inlet in proportion as the suction in the air inlet during the suction stroke increases and this operation of the air inlet valve member 40 produces a corresponding operation of the fuel controlling valve cones 42 and 43, whereby the amount of fuel supplied directly to the engine through the check valve 48 and adjacent to the ignition device 49 is controlled in correspondence with the amount of air passing to the engine through the air inlet valve and the air intake valve 4. Fuel passes to the valve casing 50 of the fuel valves above described from a pipe 51 leading from a float chamber, or other source of liquid fuel, and the amount of fuel thus supplied may be controlled by a manually operated valve 53 having an arm 54 connected for operation by any suitable means.

Fuel passes from the valve casing 50 between the valve members 43 and 45 to fuel outlet pipe 47, and also passes from said valve casing 50 through a longitudinal bore 58 in the valve stem 41, and through a lateral passage 59 to a chamber 60 from which it passes from the valve cone 42 and valve seat 45 to the upper end of the air inlet valve casing 61, so as to be mixed with the air passing through said air inlet directly to the engine cylinder. The valve cone 42 is so positioned that in its descent it contracts the opening between it and the valve seat 45 and eventually said opening is substantially closed by a cylindrical portion 65 of the valve stem passing within the valve seat; at this time, however, the valve cone 43 still permits a certain amount of fuel to pass from the fuel chamber or casing 50 to the outlet pipe 47 leading through a check valve 48 to the cylinder adjacent to the ignition device 49.

Check valve 48, as illustrated in Fig. 3, is similar to the check valve above described comprising a valve member 63 mounted in casing 64 and connected to a diaphragm 65 which is operated by pressure in a chamber 66 communicating by passage 67 with a pipe 70 leading to the spark plug 49. Said valve casing 64 is in this case provided, in addition, with an air inlet 69, and the valve closure member 63 is adapted to control admission of air from this inlet to the pipe 70 leading to the spark plug 49, at the same time that it controls admission of fuel from pipe 47 to said pipe 70. With this construction air is driven into the engine cylinder adjacent to the spark plug, along with the fuel, so as to provide for better distribution and combustion of the fuel.

What I claim is:

1. In combination with an internal combustion engine cylinder, an air intake valve and ignition means, a fuel supply means provided with a fuel outlet in communication with the engine cylinder adjacent to the ignition means thereof, and with a fuel outlet communicating with the engine cylinder through the said air intake valve, and a manually operated fuel control valve provided with passages for simultaneous control of the supply of fuel to said outlets and for maintaining fuel supply to the engine adjacent the ignition means after the fuel supply to the engine through the air inlet valve is shut off.

2. In combination with an internal combustion engine cylinder provided with ignition means and with an air inlet valve in direct and unobstructed communication with the outer air, and adapted to be opened automatically by the suction in the engine cylinder, and a manually operated fuel supply valve provided with a fuel outlet in communication with the engine cylinder adjacent to said ignition means, and with a fuel outlet communicating with the engine cylinder through said air inlet valve, said valve being provided with means for simultaneous control of a supply of fuel to said outlets.

3. An apparatus, as set forth in claim 2, wherein said valve is constructed and arranged to maintain fuel supply to the engine adjacent to the ignition means after the fuel supply to the engine through the air inlet valve is shut off.

4. In combination with an internal combustion engine cylinder provided with ignition means and with an air inlet having a valve adapted to be opened automatically by the suction in the engine cylinder, said valve being in direct unobstructed communication with the outer air, means for supplying fuel to said air inlet at a point further removed from the cylinder than said valve, means for supplying fuel to the cylinder adjacent the ignition means, and a single manually controlled valve means for regulating the supply of fuel both to the last named fuel supply means and to the fuel supply means for the air inlet.

5. In combination with the cylinder of an internal combustion engine provided with ignition means, means for supplying liquid fuel to said cylinder at a point adjacent the ignition means therefor, a check valve in said fuel supply means and adapted to cut off communication between said fuel supply means and the cylinder on increase of pressure in said cylinder, said check valve comprising a valve casing having a seat, a valve member cooperating with said seat, and adapted to open outwardly with respect to the cylinder, a pressure chamber communicating with the interior of said cylinder, and means exposed to the pressure in said pressure chamber and operating on said valve member to close the same on increase of pressure in said cylinder.

In testimony whereof I have hereunto subscribed my name this 27th day of August, 1920.

ALFRED C. STEWART.